United States Patent
Oi et al.

(10) Patent No.: US 7,344,687 B2
(45) Date of Patent: Mar. 18, 2008

(54) FUEL REFORMING SYSTEM

(75) Inventors: Takashi Oi, Yokosuka (JP); Yasukazu Iwasaki, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 407 days.

(21) Appl. No.: 10/421,782

(22) Filed: Apr. 24, 2003

(65) Prior Publication Data

US 2003/0211021 A1 Nov. 13, 2003

(30) Foreign Application Priority Data

May 8, 2002 (JP) ............................. 2002-132612

(51) Int. Cl.
C01B 3/32 (2006.01)
H01M 8/04 (2006.01)
H01M 8/06 (2006.01)
B01J 8/00 (2006.01)

(52) U.S. Cl. ....................... 422/198; 422/187; 422/105; 429/19; 429/22; 48/61; 701/22; 180/65.3

(58) Field of Classification Search ................... 48/95, 48/127.9; 422/198
See application file for complete search history.

(56) References Cited

U.S. PATENT DOCUMENTS

| | | | | |
|---|---|---|---|---|
| 4,203,963 A | * | 5/1980 | Scheffler et al. ............. | 423/650 |
| 4,588,659 A | * | 5/1986 | Abens et al. .................. | 429/20 |
| 5,609,297 A | * | 3/1997 | Gladigow et al. ........... | 239/135 |
| 5,684,703 A | * | 11/1997 | Itoh et al. .................... | 701/200 |
| 6,110,325 A | * | 8/2000 | Lyons ............................ | 203/2 |
| 6,660,244 B2 | * | 12/2003 | Negishi et al. .............. | 423/652 |
| 6,866,953 B2 | * | 3/2005 | Hiyoshi et al. ............... | 429/19 |
| 2001/0049907 A1 | | 12/2001 | Inoue | |

FOREIGN PATENT DOCUMENTS

| | | |
|---|---|---|
| EP | 1 211 743 A2 | 6/2002 |
| JP | 64-012468 | 1/1989 |
| JP | 05-294601 | 11/1993 |
| JP | 06-092602 | 4/1994 |
| JP | 07226221 A * | 8/1995 |
| JP | 08017456 A * | 1/1996 |
| JP | 2001010803 A * | 1/2001 |
| JP | P2001-10803 A | 1/2001 |
| JP | 2001-224105 | 8/2001 |
| JP | 2002-124284 | 4/2002 |
| JP | 2002-170587 | 6/2002 |

OTHER PUBLICATIONS

Japanese Office Action, issued in corresponding Japanese Patent Application No. 2002-132612, dated on Jun. 19, 2007.

* cited by examiner

*Primary Examiner*—Glenn Caldarola
*Assistant Examiner*—Jennifer A. Leung
(74) *Attorney, Agent, or Firm*—McDermott Will & Emery LLP (57) ABSTRACT

A fuel cell power plant comprises a fuel reforming system (1). The fuel reforming system (1) comprises a vaporizer (7) which vaporizes liquid fuel and supplies fuel vapor to a reformer (9). The vaporizer (7) heats injected fuel so as to vaporize it by a heating elements (7A), and supplies it to the reformer (9) via a fuel vapor supply passage (32) comprising a first valve (17). In a standby mode of the vaporizer (7) when the first valve (17) is closed, surplus fuel and heat energy in the standby state are recovered by providing a recovery passage (19, 20) which recovers fuel in the vicinity of the heating elements (7A) to the fuel tank (6) without allowing it to flowing into the vapor supply passage (32).

13 Claims, 9 Drawing Sheets

FUEL REFORMING SYSTEM

FIELD OF THE INVENTION

This invention relates to a reformer which generates reformate gas having hydrogen at its main component by reforming a hydrocarbon fuel.

BACKGROUND OF THE INVENTION

The hydrogen consumed by a fuel cell power plant may for example be generated by a fuel reforming system.

The fuel reforming system first generates fuel vapor by vaporizing a hydrocarbon fuel such as methanol or gasoline, and reforms the fuel vapor in the presence of a catalyst so as to generate reformate gas having hydrogen as its main component. However, as a considerable time is required from supply of liquid fuel to generation of reformate gas, the production amount of reformate gas cannot be controlled only by controlling the supply of liquid fuel.

Due to this delay, for example, unnecessary reformate gas may be generated when the power generation load of the power plant falls.

In this regard, JP 2001-10803 published by the Japanese Patent Office in 2001 discloses a branch pipe branching off from a fuel vapor supply pipe which connects the vaporizer and reformer. The branch pipe is connected to a fuel tank via a valve. When the fuel vapor amount required by the reformer falls due to a decrease of the power generation load etc., the valve is opened so that surplus fuel vapor is returned from the branch pipe to the fuel tank.

SUMMARY OF THE INVENTION

According to the prior art, fuel vapor collected is condensed and re-stored in the fuel tank as a liquid and re-vaporized by the vaporizer when the reformer resumes the fuel reformation. A problem associated with this recovery system is that, although surplus fuel can be recovered by this system, most of the energy consumed in vaporizing the surplus fuel cannot be recovered.

It is therefore an object of this invention to increase the recovery efficiency of thermal energy when surplus fuel is recovered.

It is a further object of this invention to shorten the start-up time of a fuel reforming system when a fuel cell power plant is re-started.

In order to achieve the above objects, this invention provides a fuel reforming system, comprising a reformer which produces reformate gas which mainly contains hydrogen by reforming a vapor of a hydrocarbon fuel, a fuel tank which stores a liquid hydrocarbon fuel, a vaporizer which produces fuel vapor by vaporizing the liquid hydrocarbon fuel supplied from the fuel tank, a vapor supply passage which supplies the fuel vapor produced by the vaporizer to the reformer, and a recovery passage for recovering fuel in the vicinity of the heating elements of the vaporizer to the fuel tank without allowing fuel to flow into the vapor supply passage. The vaporizer comprises a heating element which heats the liquid hydrocarbon fuel.

The details as well as other features and advantages of this invention are set forth in the remainder of the specification and are shown in the accompanying drawings.

DESCRIPTION OF THE PREFERRED EMBODIMENTS

Figure 1:
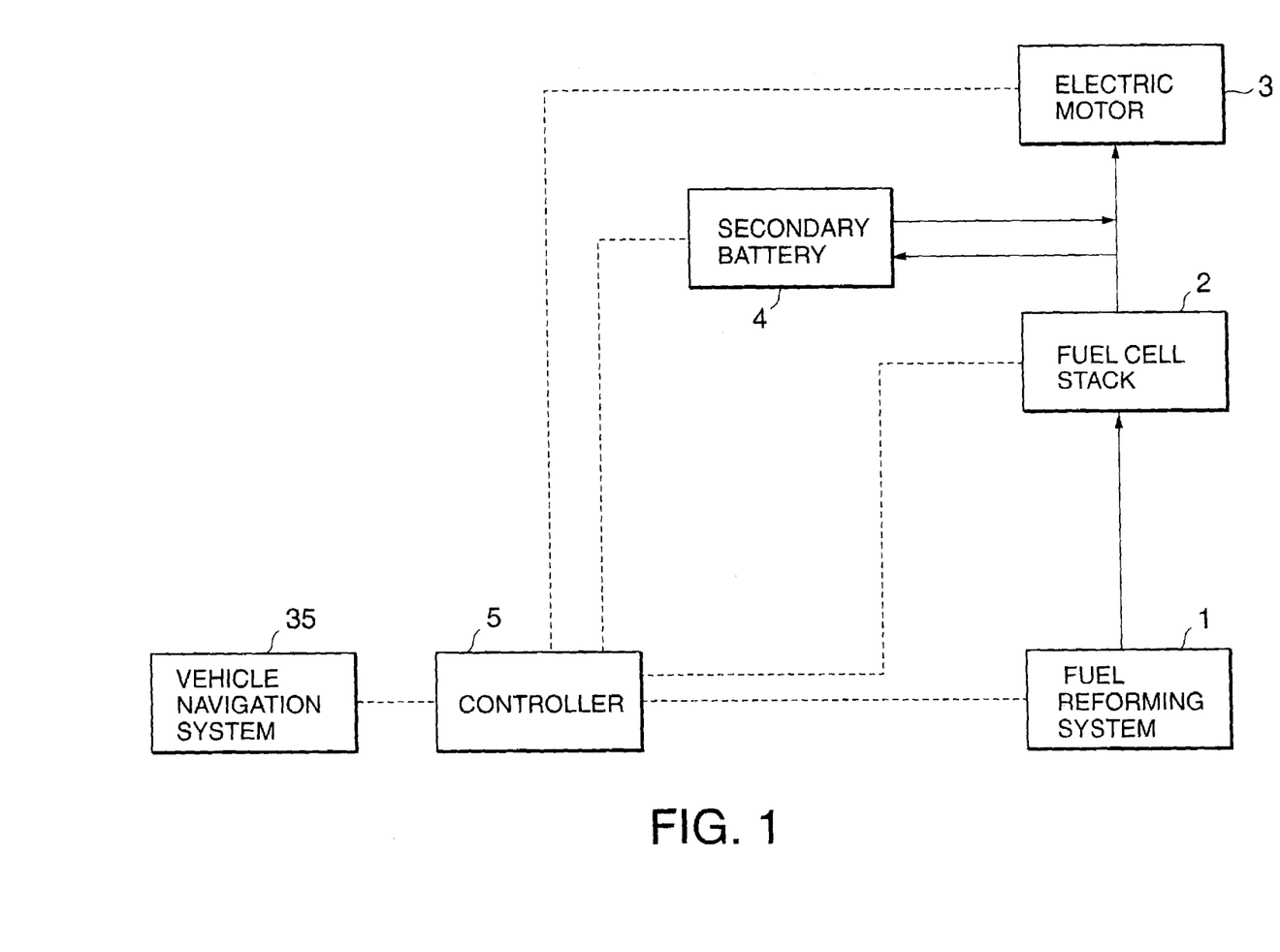
FIG. 1 is a schematic diagram of a fuel cell power plant provided with a fuel reforming system according to this invention.

Referring to FIG. 1 of the drawings, a fuel cell power plant for driving a vehicle comprises a fuel reforming system 1 which produces reformate gas containing hydrogen as its main component from methanol, and a fuel cell stack 2 which extracts power by reacting the hydrogen in the reformate gas produced by the fuel reforming system 1 with air in an electrochemical reaction. The fuel cell stack 2 is connected to an electric motor 3 driven by the power generated by the fuel cell stack 2.

The fuel cell power plant further comprises a secondary battery 4 which compensates for load fluctuations which cannot be compensated by the fuel cell stack 2, and a controller 5 which optimizes the output power of the fuel cell stack 2 according to the load of the drive motor 3.

Figure 2:
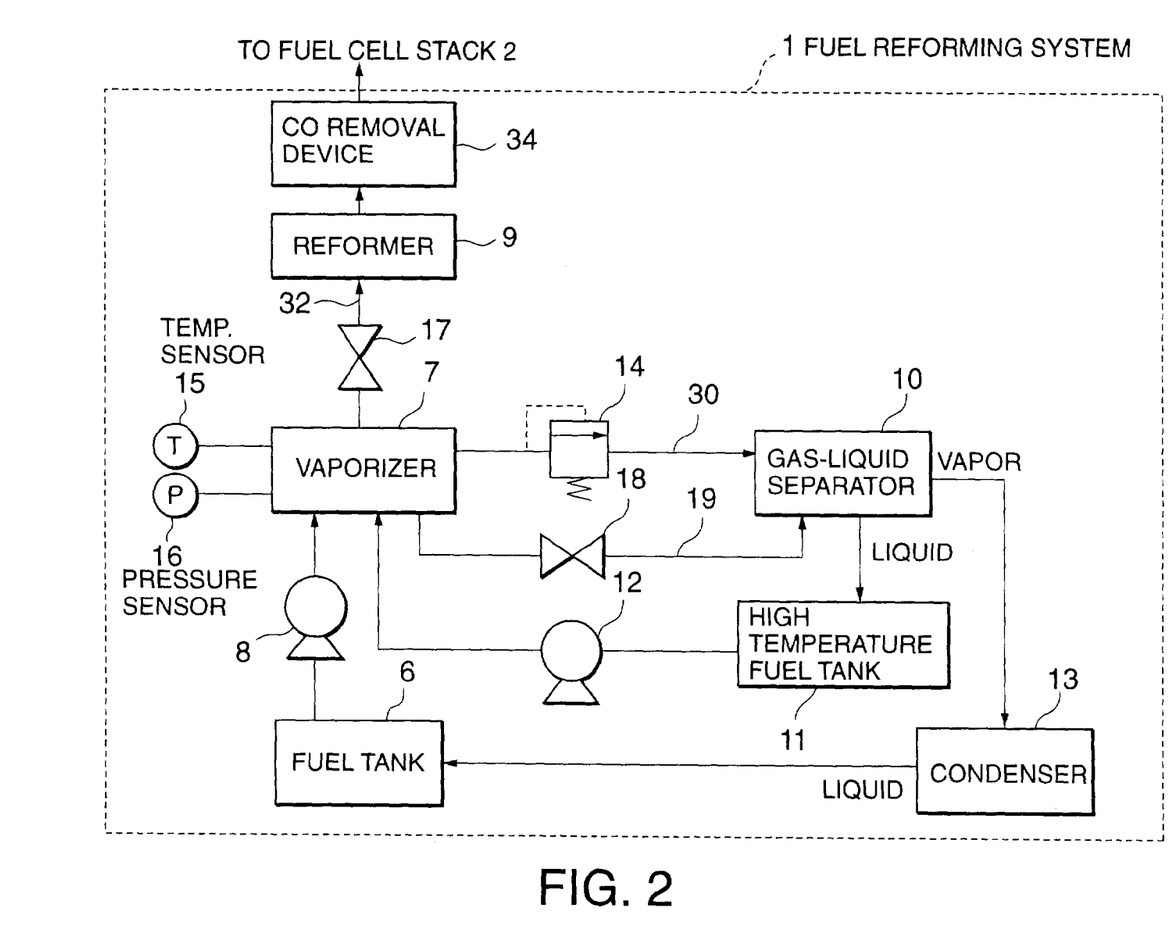
FIG. 2 is a schematic diagram of the fuel reforming system.

Referring to FIG. 2, the fuel reforming system 1 comprises a fuel tank 6 which stores a mixture of liquid methanol and water as fuel, a first fuel pump 8 which supplies fuel from the fuel tank 6 to a vaporizer 7, the vaporizer 7 which produces fuel vapor by vaporizing fuel, a reformer 9 which produces reformate gas having hydrogen as its main component by reforming fuel vapor in the presence of a catalyst, and a CO removal device 34 which removes carbon monoxide (CO) from the reformate gas.

Figure 3:
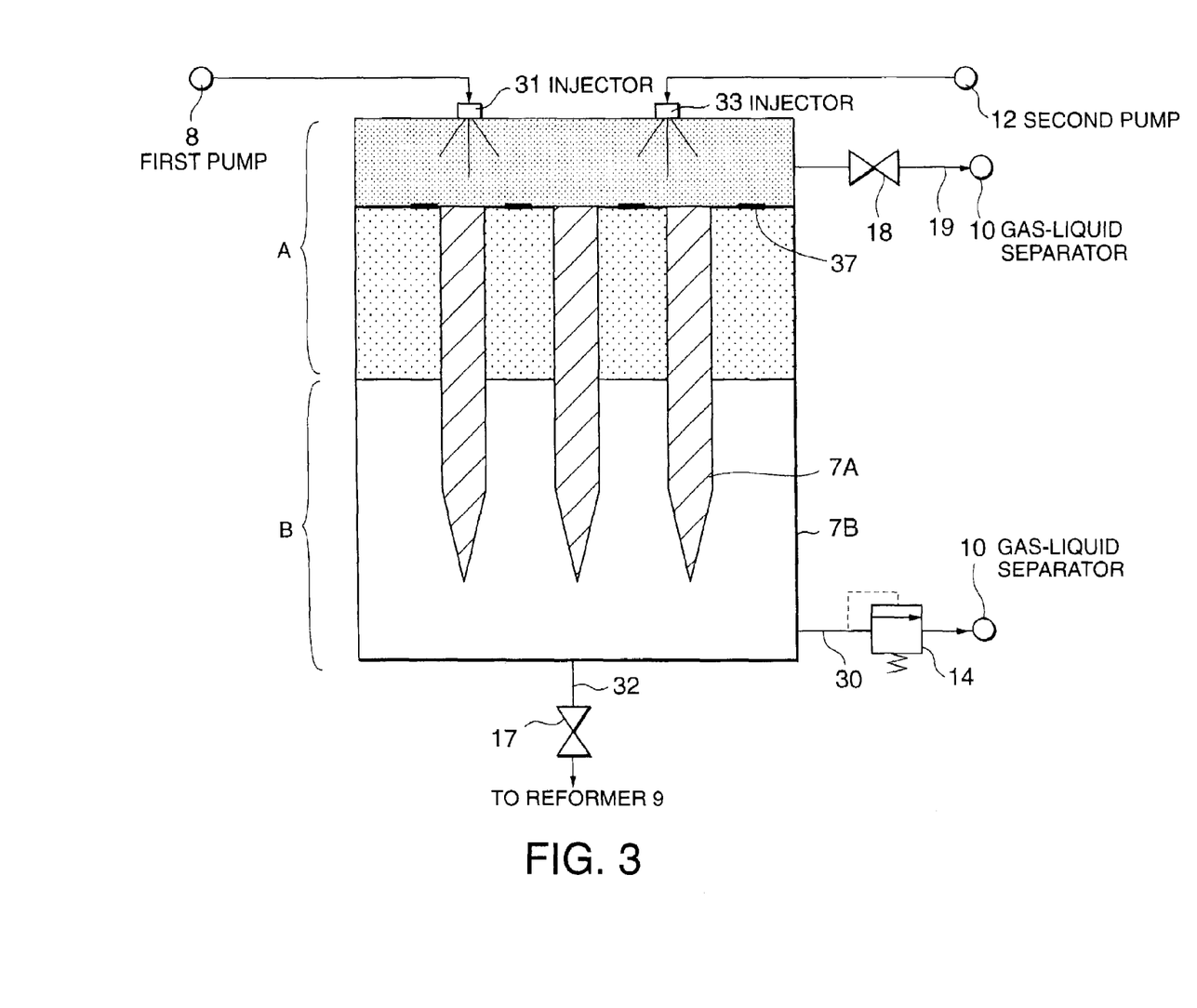
FIG. 3 is a schematic vertical sectional view of a vaporizer according to this invention

Referring to FIG. 3, the vaporizer 7 internally comprises heating elements 7A inside a housing 7B. The heating elements 7A heat fuel in the vaporizer 7 by using the heat of fuel combustion from a burner, not shown.

The liquid fuel in the fuel tank 6 is injected into the housing 7B from an injector 31. The fuel injected into the housing 7B is unified by passing through a unification filter 37, and then heated by the heating elements 7A and vaporized. As a result, a gas-liquid mixture layer A which comprises atomized fuel is formed around the heating elements 7A and a fuel vapor layer B is formed in a lower part of the housing 7B.

The liquid mixture supplied to the vaporizer 7 as fuel has methanol as its main component, but it may also have gasoline as its main component. Also, an aqueous solution of hydrogen peroxide may be used instead of water as a component of the liquid mixture. Further, instead of supplying the liquid mixture to the vaporizer 7, methanol and water may for example be supplied separately to the vaporizer 7, and mixed inside the vaporizer 7. The water produced by the power generation of the fuel cell stack 2 may be used instead of supplying water from outside.

The fuel vapor in the layer B of the vaporizer 7 is supplied, by a fuel vapor supply passage 32 to the reformer 9 via a first valve 17.

A recovery passage 19 for recovering surplus fuel and a relief passage 30 provided with a relief valve 14 for maintaining a fixed pressure environment, are also connected to the housing 7B. The relief passage 30 the recovery passage 19 opens onto the upper part of the housing 7B adjacent to the gas-liquid mixture layer A in the vicinity of the heating elements 7A.

Referring again to FIG. 2, the fuel reforming system 1 further comprises a gas-liquid separator 10, high temperature fuel tank 11, second fuel pump 12 and condenser 13 for treating the recovered fuel. The gas-liquid separator 10 separates fuel in the gas-liquid mixed state flowing in from the recovery passage 19, into liquid fuel and fuel vapor. The liquid fuel flows into the high temperature fuel tank 11, while the fuel vapor flows into the condenser 13.

The fuel vapor flowing into the condenser 13 is condensed to a liquid in the condenser 13, and after it has been re-liquefied, it is recirculated to the fuel tank 6. The fuel in the gas-liquid mixed state flowing from the vaporizer 7 into the gas-liquid separator 10, is at a high temperature due to being heated by the heating elements 7A in the vaporizer 7. Therefore, the liquid fuel separated by the gas-liquid separator 10 is also at high temperature. This high temperature liquid fuel is stored in the high temperature fuel tank 11. The high temperature fuel tank 11 may be formed in one piece with the gas-liquid separator 10.

The high temperature liquid fuel tank 11 is connected to a second injector 33 installed in the vaporizer via a second pump 12. The high temperature fuel tank 11 has the following functions. Specifically, when the fuel cell power plant stops operating and is restarted in a short time, it promotes vaporization of fuel in the vaporizer 7 by supplying high temperature fuel to the vaporizer 7. As a result, when the power plant is restarted immediately after stopping operation, the fuel cell stack 2 can begin generating power in a shorter time than if it were started after a long stop.

The reformer 9 generates hydrogen-rich reformate gas by reforming fuel vapor supplied from the vaporizer 7. The reformer 9 may perform any of a steam reforming, a partial oxidation reaction, or an autothermal reforming (ATR) which combines these functions.

After removing carbon monoxide from the reformate gas generated by the reformer 9 in the CO removal device 34, it is supplied to the fuel cell stack 2.

Any of an apparatus for separating hydrogen such as an apparatus using a separating membrane, a preferential oxidation reactor and a shift converter can be used as the CO removal device 34. The fuel cell stack 2 may comprise any type of fuel cell which generates power using hydrogen and oxygen.

Output power control of the fuel cell stack 2 by the controller 5 is performed by flow control of the reformate gas supplied from the reforming system 1 to the fuel cell stack 2. Flowrate control of reformate gas means that the controller 5 controls the operation of the first pump 8 and second pump 12, and the opening of the first valve 17 and second valve 18.

To obtain the parameters required for this control, the fuel reforming system 1 comprises a temperature sensor 15 which detects the temperature of the vaporizer 7, and a pressure sensor 16 which detects the pressure of the fuel vapor in the vaporizer 7. The data detected by the sensor 15, 16 are input as signals to the controller 5.

The vehicle is provided with a vehicle navigation system 35 which provides information about the vehicle route by a combination of a global positioning system (GPS) which detects the current vehicle position and topographical information stored internally. The route information provided by the vehicle navigation system 35 is input as signals to the controller 5.

When the required power of the drive motor 3, i.e., the load, decreases when the fuel cell power plant is in the steady running state, the controller 5 controls the operation of the first pump 8 so that the supply amount of liquid fuel from the fuel tank 6 to the vaporizer 7 is stopped or decreased. However, due to the time lag from when the supply amount of liquid fuel is stopped or decreased to when the reformate gas supply to the fuel cell stack 2 is stopped or decreased, the fuel vapor amount supplied from the vaporizer 7 to the reformer 9 becomes momentarily excessive.

The first valve 17 is throttled according to the load decrease, but as the vaporization of fuel by the heating elements 7A does not stop immediately, the fuel vapor pressure in the vaporizer 7 rises. In this situation, the controller 5 opens the second valve 18, and fuel in the vaporizer 7 flows into the gas-liquid separator 10 through the recovery passage 19 in the gas-liquid mixed state. The liquid fuel separated by the gas-liquid separator 10 is recovered by the high temperature fuel tank 11, and the fuel vapor is recovered by the fuel tank 6 via the condenser 13. Hence, by rapidly recovering the surplus fuel in the gas-liquid mixed state, production of surplus fuel vapor by the heating element 7A is suppressed.

After the fuel cell power plant has stopped operating, the high temperature liquid fuel recovered by the high temperature fuel tank 11 is used in a short time when the power plant is restarted. By supplying the high temperature fuel in the high temperature fuel tank 11, the time until the vaporizer 7 starts supplying fuel vapor is shorter than when the fuel in the fuel tank 6 is supplied to the vaporizer 7, so the fuel cell stack 2 can start generating power quickly. In other words, the heat energy in the vaporizer 7 which is recovered when there is a load decrease, can be used for restarting the fuel cell power plant. As a result, the time required to restart the fuel cell power plant can be shortened.

It is possible that, even when the vehicle is running, the production of reformate gas by the reformer 9 becomes unnecessary. For example, when the charge amount of the secondary battery 4 is near its upper limit, or when the power generation load of the fuel cell stack 2 falls due to the vehicle travelling downhill, the production of reformate gas is then unnecessary. Also, when the vehicle stops temporarily at traffic lights, production of reformate gas may be unnecessary. When the vehicle stops running, production of reformate gas is absolutely unnecessary. The situation where production of reformate gas is unnecessary is generally referred to as the standby state of the reforming system 1.

Figure 4:
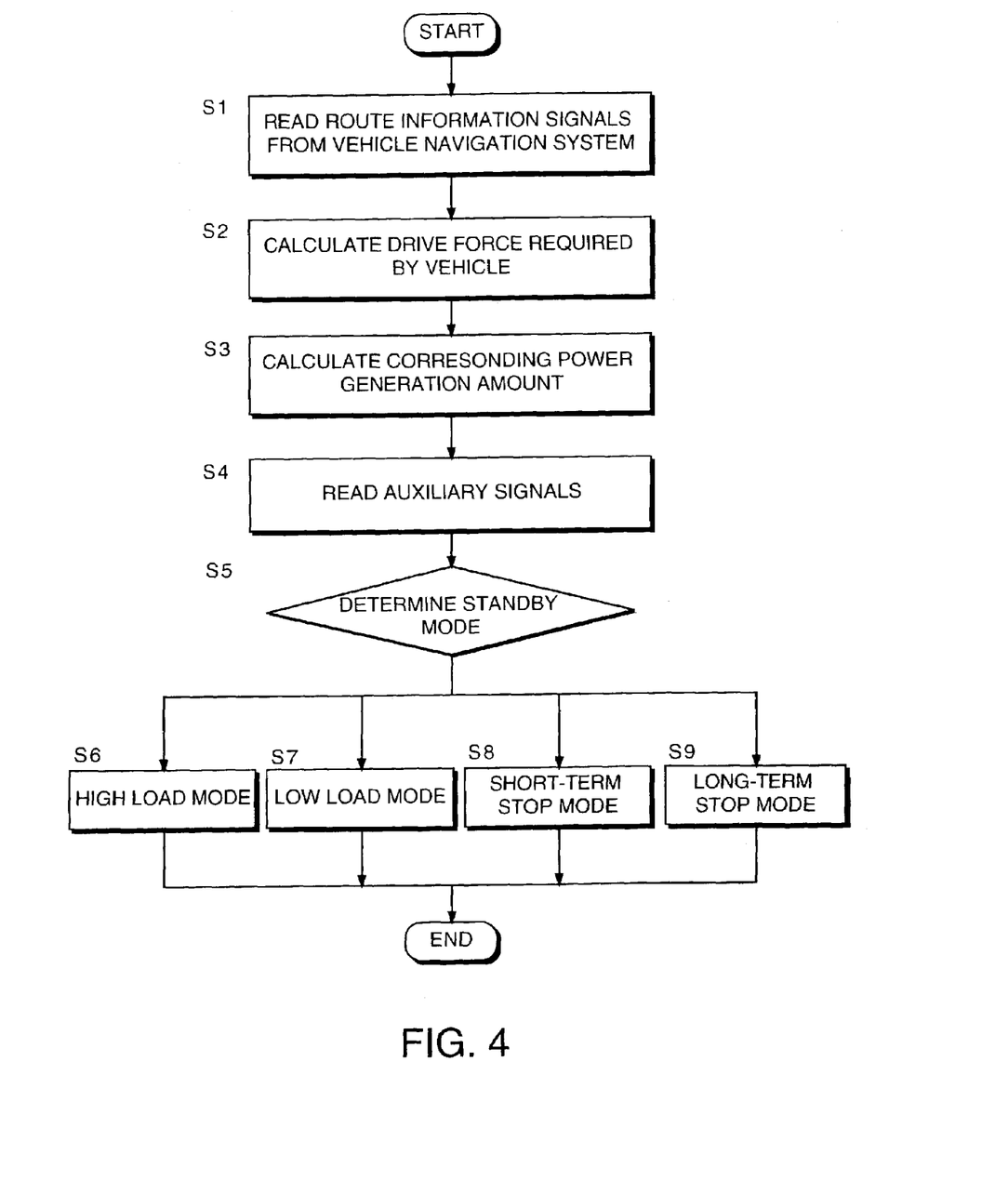
FIG. 4 is a flowchart describing a standby mode selection routine performed by a controller according to this invention.

The controller 5 suppresses heat energy losses in the standby state, and performs the standby mode selection routine shown in FIG. 4 so that the reforming system 1 can begin supplying reformate gas again from the standby state within a short time. This routine is executed at an interval of a hundred milliseconds when the first valve 17 is closed.

First, in a step S1, the controller 5 reads the route information signals from the vehicle navigation system 35.

In a next step S2, the drive force required by the vehicle is calculated based on the route information signals In a next step S3, the power generation required by the fuel cell power plant to cover the required drive force, is calculated.

In a next step S4, a temperature and vapor pressure of the vaporizer 7 are read. Also, the accelerator depression, the vehicle speed, road slope, a brake signal showing whether or not the vehicle is braking, a direction signal from a direction indicator, a signal showing the charge state of the secondary battery 4, and a timer signal which measures the elapsed time from when the vehicle stopped, are respectively read. The signals read in the step S4 are referred to as auxiliary signals. The signals have the function of complementing the route information signal provided by the vehicle navigation system 35.

In a next step S5, one of the following four standby modes is selected based on the read signals.

High Load Mode:

The second valve 18 is throttled or closed. Heat supply to the heating elements 7A is continued, and the fuel vapor pressure of the vaporizer 7 is maintained at a high pressure. A large amount of high pressure fuel vapor is stored in the vaporizer 7. On the other hand, as the boiling point of the fuel rises due to the high pressure, the vaporizer 7 must be maintained at a high temperature. In this high load mode, a large amount of heat energy is consumed to maintain the vaporizer 7 at a high temperature, so fuel cost-performance is poor, but as a large amount of fuel vapor is stored in the vaporizer 7, fuel vapor supply to the reformer 9 can be restarted with a high response by opening the first valve 17. Excessive pressure rise of the vaporizer 7 is prevented by the relief valve 14 and relief passage 30. Alternatively, the relief passage 30 can be omitted, and the controller 5 may open the first valve 17 and second valve 18 when the pressure detected by the pressure sensor 16 exceeds a predetermined upper limiting pressure.

Low Load Mode:

The second valve 18 is opened. In the vaporizer 7, high temperature fuel in the gas-liquid mixed state heated by the heating member 7A flows out from the second valve 18 to the gas-liquid separator 10 via a recovery passage 19. The fuel which flowed into the gas-liquid separator 10 is separated into fuel vapor and liquid fuel by the gas-liquid separator 10, and after the fuel vapor is condensed in the condenser 13, it is recovered as liquid by the fuel tank 6. On the other hand, liquid fuel is stored in the high temperature fuel tank 11 while maintaining its high temperature. When operation of the reforming system 1 restarts, the time until fuel vapor is produced, is shortened by the second pump 12 supplying high temperature fuel from the high temperature fuel tank 11 to the vaporizer 7 via the second injector 33. During standby in the low load mode of the fuel reforming system 1, energy losses are less than during standby in the high load mode, but as the fuel vapor pressure in the vaporizer 7 is atmospheric, the response of controlling the fuel vapor supply to the reformer 9 is slower than in the high load mode.

Short-Term Stop Mode:

The second valve 18 is opened, and heat supply to the heating elements 7A is stopped.

In the short-term stop mode, as the supply of heat to the heating elements 7A is stopped, energy losses are even lower than in the low load mode, but as the temperature of the vaporizer 7 is lower than in the low load mode, a large heat amount is required when the reforming system 1 is restarted, and some time is required until supply of fuel vapor to the reformer 9 restarts.

The short-term stop mode is applied to when the vehicle stops for relatively short periods. To maintain a minimum response for restarting fuel vapor supplied to the reformer 9, a lower limiting temperature T0 of the vaporizer 7 is determined, and the temperature of the vaporizer 7 may be adjusted by an electric heater so that the temperature detected by the temperature sensor 15 does not fall below the lower limiting temperature T0 of the vaporizer 7.

Long-Term Stop Mode:

This corresponds to the short-term stop mode where the temperature adjustment sequence to the lower limiting temperature T0, is omitted. After fuel is recovered from the vaporizer 7 to the high temperature fuel tank 11 or fuel tank 6 via the second valve 18, the running of the fuel reforming system 1 is stopped. The long-term stop mode is applied to the case where the vehicle stops for a long period.

When the reforming system 1 restarts, the vaporizer 7 is at a lower temperature than in the short-term stop mode. The long-term stop mode has the lowest energy consumption of the four modes, but when the reforming system 1 is restarted, a large amount of energy is required until the fuel is vaporized by the heating elements 7A and more time is required for restarting than in the short-term stop mode.

Typical criteria for selecting the mode in the step S5 based on the route information signals from the vehicle navigation system 35 are as follows:

(1) When the vehicle is expected to undergo frequent acceleration and deceleration, i.e., when the vehicle is travelling on mountain roads, the high load mode is selected.

(2) When the vehicle is expected to travel at a constant speed for a certain distance, i.e., when for example the vehicle is traveling on a flat road with a gentle slope, the low load mode is selected.

(3) When the vehicle enters an expressway from an urban area, as a large load is expected, the mode is changed over from the low load mode to the high load mode.

(4) When the vehicle is expected to stop at traffic lights, the short-term stop mode is selected.

In addition to the above mode selection criteria, control precision is enhanced by providing the following criteria based on complementary signals.

(5) When the vehicle is travelling on a left-hand lane and stops at an intersection while exhibiting a right-hand signal, is determined that the vehicle is waiting to turn right, and the high response high load mode is selected.

(6) When the accelerator pedal depression amount exceeds a predetermined amount, even when the state of the road corresponds to the low load mode, the high response high load mode is selected.

(7) When the slope of the road is large, even when the state of the road corresponds to the aforesaid low load mode, the high response high load mode is selected.

(8) When the charge amount of the secondary battery 4 is low, the high load mode is selected.

(9) When it is determined from the data input from the vehicle navigation system 35, that the vehicle has stopped in a parking lot, and the switch of the vehicle drive system has been switched off, it is determined that this is a short-term stop, and the short-term stop mode is selected. Further, when the elapsed time in the short-term stop mode reaches a predetermined time T1, it is determined that this is a long-term stop, and the long-term stop mode is applied.

All or some of the standby modes can be selected also by a driver's manual operation. For example, when it is known in advance that the vehicle will be parked for a long time, a driver operation switches over directly from the high load mode or low load mode to the long-term stop mode without passing through the short-term stop mode.

As the selection result of the step S5, the controller 5, in steps S6-S9, controls the second valve 18 and heat supply to the heating elements 7A. After performing the processing of any of the steps S6-S9, the controller 5 terminates the routine.

Figure 5:
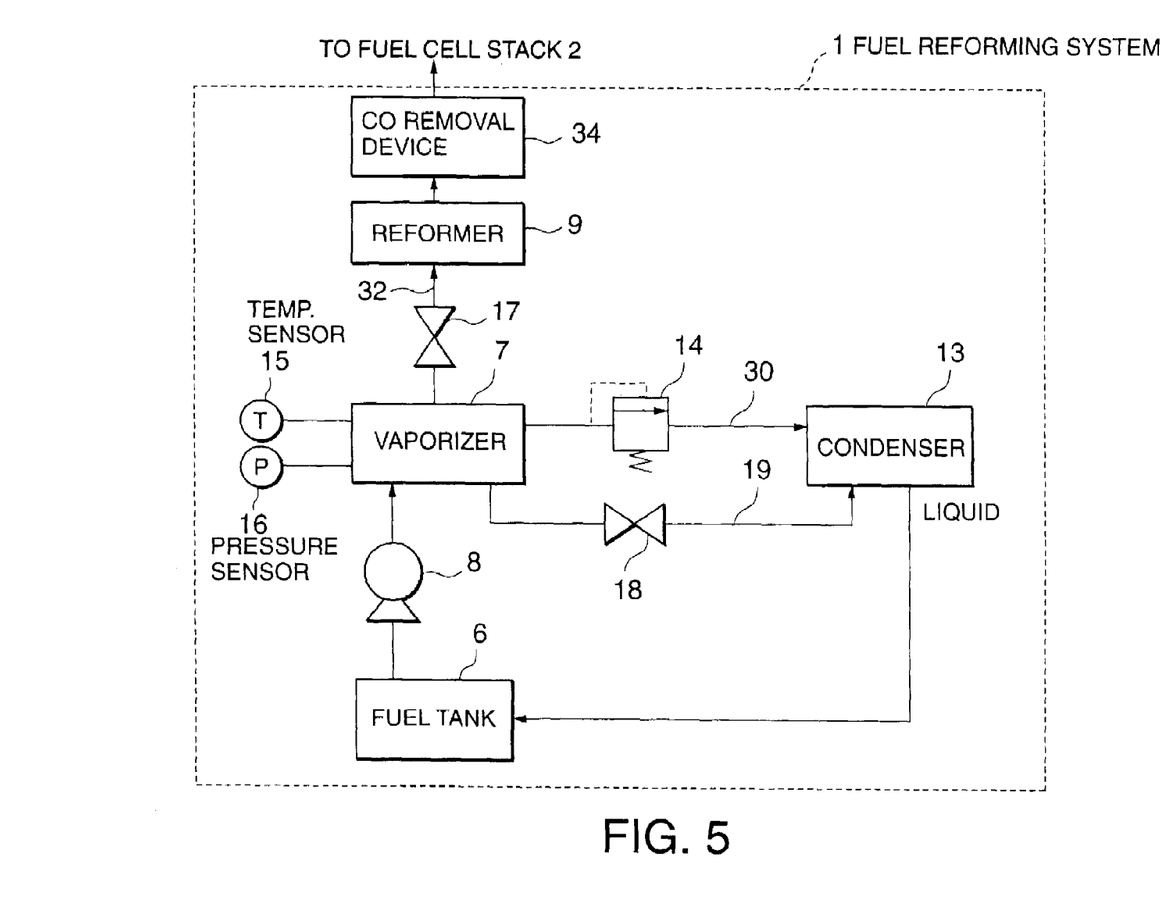
FIG. 5 is a schematic diagram of a fuel cell reforming system according to a second embodiment of this invention.

Next, a second embodiment of this invention will be described referring to FIGS. 5-7.

In the reforming system 1 according to this embodiment, the gas-liquid separator 10, high temperature fuel tank 11 and second pump 12 are omitted from the reforming system 1 of the first embodiment shown in FIG. 2, and the recovery passage 19 and relief valve 30 are directly connected by the condenser 13. Also, the vaporizer 7 has the construction shown in FIG. 6. Excepting for the fuel reforming system 1, the construction of the fuel cell power plant is identical to that of the first embodiment.

Figure 6:
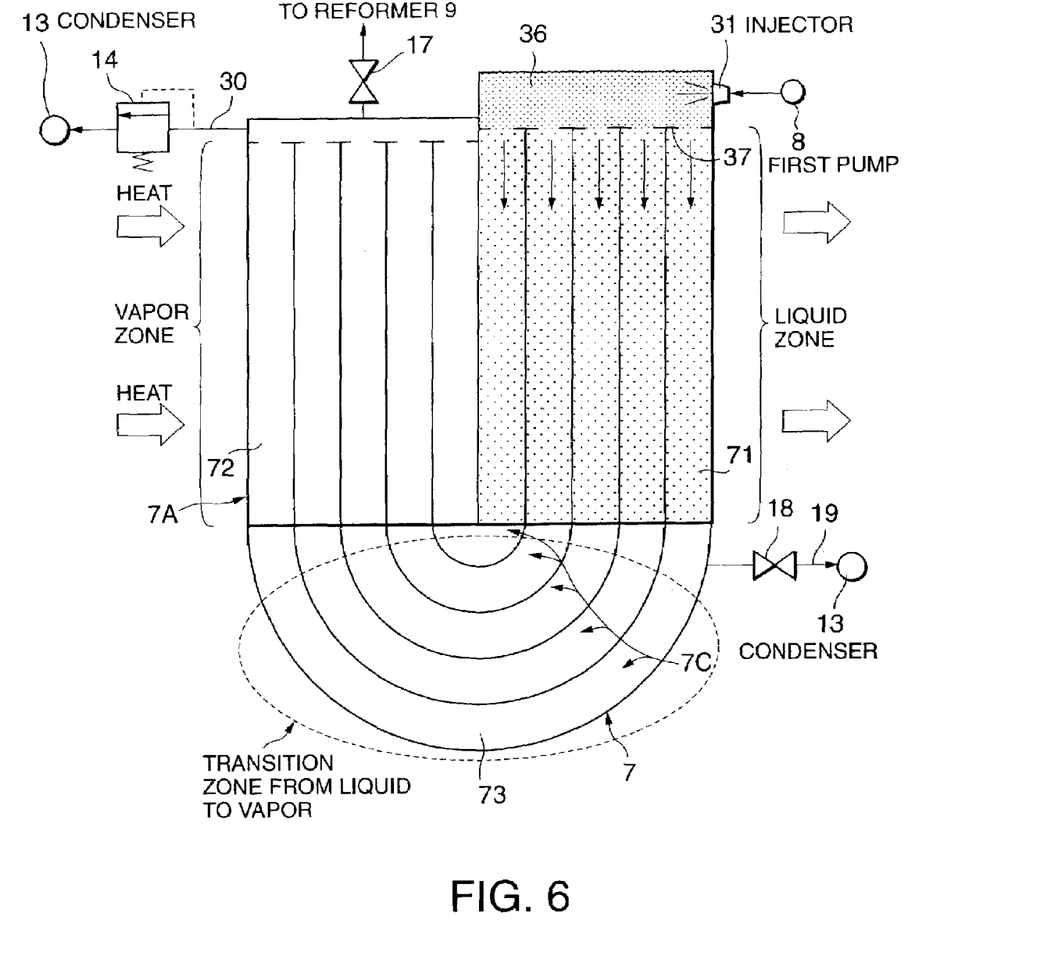
FIG. 6 is a vertical sectional view of a vaporizer according to the second embodiment of this invention.

Referring to FIG. 6, the vaporizer 7 comprises heat-exchange type heating elements 7A. Plural parallel U-shaped fuel passages 7C are formed inside the vaporizer 7. The fuel passages 7C have two straight parts 71, 72 and a curved middle part 73 connecting them.

The heating elements 7A heat only the straight parts 71, 72. A collector 36 is provided at the upper end of the straight part 71, and liquid fuel discharged by the first fuel pump 8 is injected by the injector 31 into the collector 36. The injected fuel is supplied evenly to the fuel passages 7C via a unification filter 37 in the atomized state.

In the straight part 71, the atomized fuel is heated by the heating elements 7A, and in the straight part 72, the fuel is again heated by the heating elements 7A so that it is completely converted to fuel vapor. The curved part 73 connecting the straight parts 71, 72 is situated in the lowermost position, and part of the atomized fuel which was not vaporized in the straight part 71 temporarily stays in this curved part 73. After this atomized fuel has been completely vaporized by passing through the straight part 72, it is supplied to the reformer 9 as fuel vapor via the first valve 17.

The recovery passage 19 is connected to the upstream part of the curved part 73 via the second valve 18. When the second valve 18 is opened during operation of the vaporizer 7, fuel in the process of vaporization flowing in the curved part 73, flows into the condenser 13 via the recovery passage 19, and after liquefaction in the condenser 13, is recovered by the fuel tank 6.

The straight part 72 is connected to the relief passage 30 via the relief valve 41. The relief passage 30 opens at a predetermined relief pressure so that the pressure of the fuel vapor in the straight part 72 does not become excessive, and the fuel vapor in the straight part 72 is recovered by the condenser 13 via the relief passage 30.

According to this embodiment, fuel in the process of vaporization is recovered from the middle part 73, so fuel in the straight part between the collector 36 and middle part 73 remains. Therefore, if the power generation load again increases from the decrease state, fuel vapor can be supplied to the reformer 9 more rapidly than in the case of the vaporizer 7 of the first embodiment.

Figure 7:
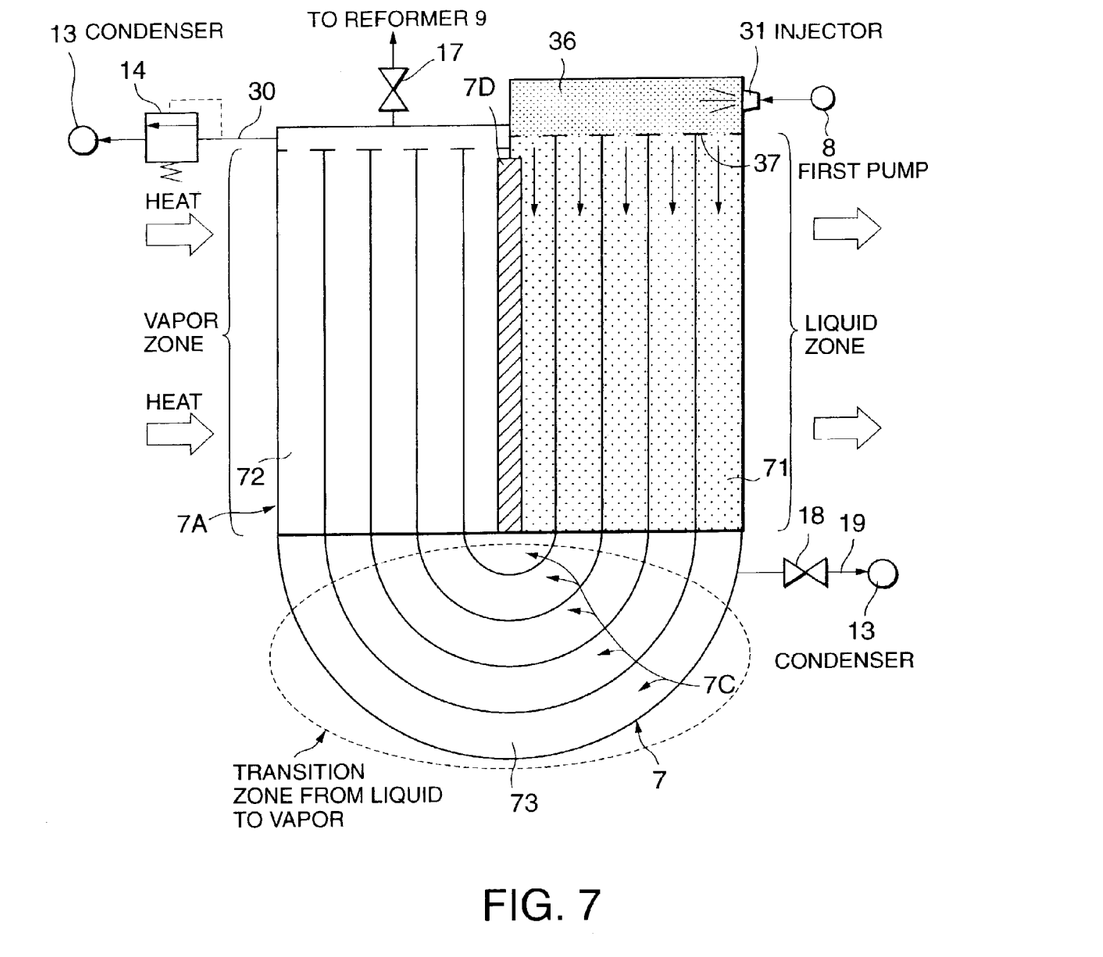
FIG. 7 is a vertical sectional view of the vaporizer describing a variation within the second embodiment of this invention.

In the vaporizer 7, it is preferred to dispose a heat insulating material 7D shown in FIG. 7 between the adjacent straight parts 71, 72 of the fuel passage 7C. Whereas the fuel in the straight part 72 is a vapor, most of the fuel in the straight part 71 is in the atomized state immediately after injection. Due to the latent heat accompanying vaporization of the fuel, the straight part 71 is at a lower temperature than the straight part 72. When the heat insulating material 7D is disposed between the straight parts 71, 72, even in the state where operation was stopped, the heat insulating material blocks heat transmission from the straight part 72 to the straight part 71, so fuel connected in the straight part 71 is not easily vaporized. Therefore, unnecessary production of fuel vapor after operation is stopped can be prevented, and when operation is restarted, fuel vapor can be supplied rapidly to the reformer 9 due to the heat retained by the straight part 72.

According also to this embodiment, the controller 5 selects various standby modes by executing an identical routine to that of FIG. 4 of Embodiment 1.

According to this embodiment, high temperature fuel in the liquid phase is stored in the atomized state in the straight part 71 of the vaporizer 7 without providing the high temperature fuel tank 11 of the first embodiment, so when the reforming system 1 restarts or the load increases, fuel vapor can be supplied rapidly to the reformer 9 using the high temperature liquid fuel which has been stored.

Figure 8:
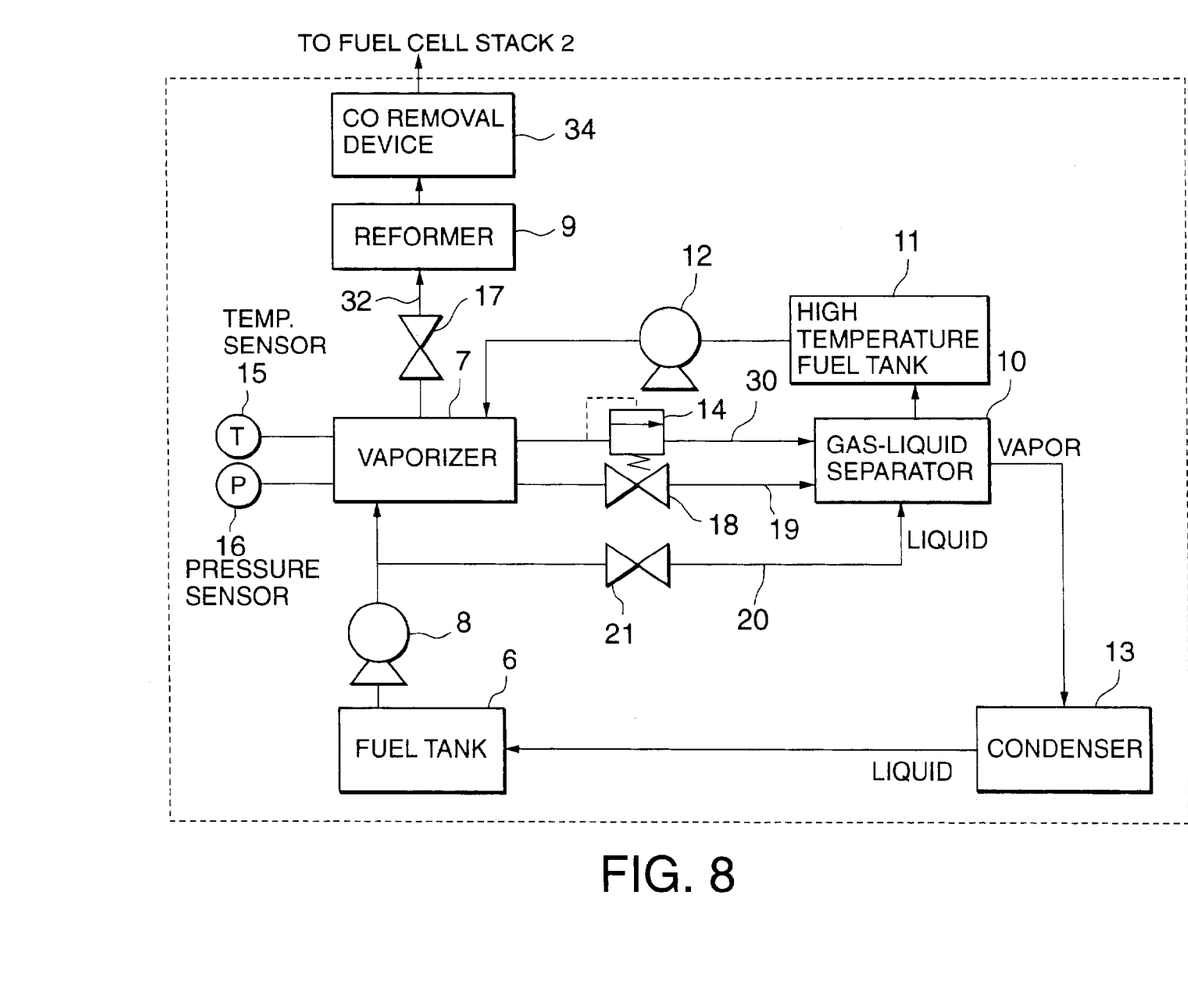
FIG. 8 is a schematic diagram of a fuel reforming system according to a third embodiment of this invention.
Figure 9:
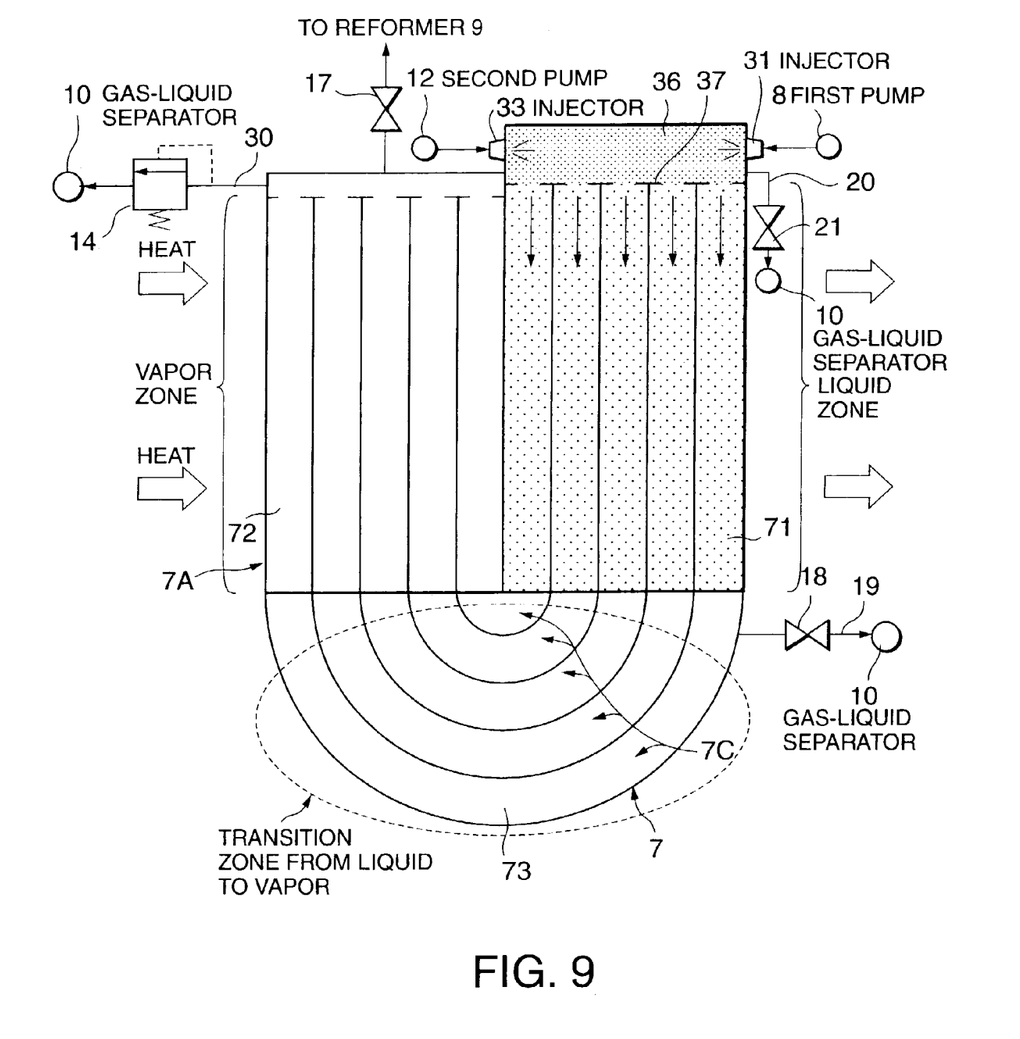
FIG. 9 is a vertical sectional view of a vaporizer according to the third embodiment of this invention.

Next, a third embodiment of this invention will be described referring to FIGS. 8 and 9.

In this embodiment, in addition to the fuel reforming system 1 of the second embodiment, the gas liquid separator 10 and high temperature fuel tank 11 identical to those of the first embodiment, are further provided. Also, a second recovery passage 20 is provided comprising a third valve 21 which recovers the fuel discharged by the first fuel pump 8 into the gas-liquid separator 10.

When the fuel reforming system 1 stops operating for a long time, the second recovery passage 20 has the function of collecting fuel discharged before the first fuel pump 8 and recirculating it to the fuel tank 6 via the third valve 21, gas-liquid separator 10 and condenser 13 without passing it into the vaporizer 7. Due to this function, the extent of temperature drop of the vaporizer 7 while the fuel reforming system 1 has stopped operating is reduced, and the response for restarting the fuel reforming system 1 is improved.

The standby modes in this embodiment are as shown below. Herein, only the operation of the fuel reforming system 1 required to realize the standby modes will be described. The mode characteristics will be described regarding only the points which are different from those of the first embodiment.

High Load Mode:

The second valve 18 and the third valve 21 are both closed or throttled.

Low Load Mode

The second valve 18 is opened, and the third valve 21 is closed.

Short-Term Stop Mode:

In addition to the same operation as that of the low load mode, supply of heat to the heating elements 7A is stopped.

Long-Term Stop Mode:

The second valve 18 is closed, and the third valve 21 is opened.

In this embodiment also, the controller 5 selects the above standby modes by executing an identical routine to that of FIG. 4 of the first embodiment.

According to this embodiment, in the long-term stop mode, the vaporizer 7 is heated and the third valve 21 is opened, so fuel in the vaporizer 7 can be recovered by the recovery passage 20. Therefore, surplus fuel vapor produced by the response delay of the vaporizer 7 and residual fuel in the liquid phase can be promptly recovered. As the residual liquid phase fuel is recovered, the extent of temperature drop during a long-term stop of the vaporizer 7 is reduced.

This embodiment is provided with the first recovery passage 19 and the second recovery passage 21, and surplus fuel in the vaporizer 7 is recovered from either of these passages according to the standby mode. However, the prior art where fuel vapor is recovered midway in the fuel vapor supply passage 32 leading from the vaporizer 7 to the reformer 9, and one or both of the first recovery passage 19 and second recovery passage 21, may be combined.

The contents of Tokugan 2002-132612, with a filing date of May 8, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, the fuel reforming system 1 of this invention is not necessarily applied to a fuel cell power plant, and may be applied also to a reformate gas combustion engine. Also, when the fuel reforming system 1 is applied to a fuel cell power plant, a capacitor may be installed instead of the second battery 4. Further, the fuel reforming system 1 of this invention may be applied also to a fuel cell power plant not including a battery to compensate load fluctuations. Further, the fuel reformed by the fuel reforming system 1 is not limited to methanol, but any hydrocarbon fuel such as gasoline can be used instead of methanol.

The heat insulating material 7D described in the second embodiment may be applied also to the third embodiment.

The embodiments of this invention in which an exclusive property or privilege is claimed are defined as follows:

What is claimed is:

1. A fuel reforming system, comprising:
a reformer which produces reformer gas which mainly contains hydrogen by reforming a vapor of a hydrocarbon fuel;
a first fuel tank which stores a liquid hydrocarbon fuel;
a vaporizer which produces fuel vapor by vaporizing the liquid hydrocarbon fuel supplied from the first fuel tank, the vaporizer comprising a housing and a heating element which is disposed in the housing and heats the liquid hydrocarbon fuel;
a vapor supply passage which is directly connected to the vaporizer at a point downstream of the heating element with respect to flow of fuel vapor and supplies the fuel vapor produced by the vaporizer to the reformer;
a recovery passage which is directly connected to the vaporizer at a point upstream of the vapor supply passage with respect to the flow of fuel vapor for and recovers fuel in the vicinity of the heating element of the vaporizer to the fuel tank without allowing fuel to flow into the vapor supply passage;
a gas-liquid separator which separates the fuel recovered by the recovery passage into gaseous phase fuel and liquid phase fuel; and
a second fuel tank which collects the liquid phase fuel separated by the gas-liquid separator, and a pump which supplies fuel in the second fuel tank to the vaporizer.

2. The fuel reforming system as defined in claim 1, wherein the fuel reforming system further comprises a condenser which condenses the fuel recovered by the recovery passage.

3. The fuel reforming system as defined in claim 1, wherein the vaporizer comprises an injector which injects liquid fuel supplied from the fuel tank in the vicinity of the heating member.

4. The fuel reforming system as defined in claim 3, wherein the recovery passage comprises a passage which recovers fuel in a gas-liquid mixed state formed in the vicinity of the heating element.

5. The fuel reforming system as defined in claim 3, wherein the vaporizer comprises a fuel passage, the fuel passage having an upstream part and downstream part disposed in parallel, and a curved middle part connecting the upstream part and downstream part, and the heating element heats the upstream part and downstream part.

6. The fuel reforming system as defined in claim 5, wherein the vaporizer further comprises a heat insulating material which blocks transmission of heat between the upstream part and the downstream part.

7. The fuel reforming system as defined in claim 5, wherein the recovery passage comprises a passage connected to the middle part.

8. The fuel reforming system as defined in claim 7, wherein the recovery passage further comprises a passage connected upstream of the upstream part of the fuel passage.

9. The fuel reforming system as defined in claim 1, wherein the system further comprises a relief valve which relieves a pressure higher than a predetermined pressure in the vaporizer.

10. The fuel reforming system as defined in claim 1, wherein the fuel reforming system is adapted to be connected to a fuel cell power plant used to drive a vehicle, and the fuel reforming system further comprises a first valve which opens and closes the vapor supply passage, a second valve which opens and closes the recovery passage, a sensor which detects a running condition of the vehicle, and a controller programmed to control an opening of the second valve and an operation of the heating element according to the running condition of the vehicle.

11. The fuel reforming system as defined in claim 10, wherein, the controller is further programmed to selectively apply plural standby modes to the fuel reforming system in a state where a supply of the liquid hydrocarbon fuel to the vaporizer is stopped and the first valve is closed, the plural standby modes comprising a first standby mode wherein the second valve is closed while the heating element is kept activated, and a second standby mode wherein the second valve is opened while the heating element is kept activated.

12. The fuel reforming system as defined in claim 11, wherein the plural standby modes further comprise a third standby mode wherein the second valve is opened while the heating element is deactivated.

13. The fuel reforming system as defined in claim 10, wherein the sensor comprises a vehicle navigation system which detects information relating to a vehicle route.

* * * * *